(12) United States Patent
Warmink

(10) Patent No.: US 6,301,709 B1
(45) Date of Patent: Oct. 9, 2001

(54) CIRCUIT PACK SYSTEM WITH SEMI-OR FULLY-AUTOMATIC UPGRADE CAPABILITY

(75) Inventor: Stuart Warmink, Morristown, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/201,515

(22) Filed: Nov. 30, 1998

(51) Int. Cl.[7] ............................................. G06F 9/45
(52) U.S. Cl. ............................................... 717/11
(58) Field of Search .................................... 717/11

(56) References Cited

U.S. PATENT DOCUMENTS 5,430,877 * 7/1995 Naylor ................................. 717/11
6,070,012 * 5/2000 Eitner et al. ........................ 717/11

OTHER PUBLICATIONS

Lin et al., Distributed Network Computing over Local ATM Networks, May 1994, 154–163.*

* cited by examiner

Primary Examiner—Mark R. Powell
Assistant Examiner—John Q. Chavis
(74) Attorney, Agent, or Firm—Schnader Harrison Segal & Lewis LLP

(57) ABSTRACT

A method for handling upgrades of systems comprising two circuit packs which contain memory. In one embodiment, on some trigger signal to a circuit pack, that circuit pack acts as a slave circuit pack, and causes version information for the data stored in the memory of the second circuit pack, which acts as a master circuit pack, to be transferred to the slave circuit pack. If the transferred version information indicates that the data in the slave circuit pack should be updated, the slave circuit pack causes a transfer of information from memory in the master circuit pack to the slave circuit pack, and stores the new information in the memory of the slave circuit pack.

17 Claims, 1 Drawing Sheet

CIRCUIT PACK SYSTEM WITH SEMI-OR FULLY-AUTOMATIC UPGRADE CAPABILITY

BACKGROUND OF THE INVENTION

1. Field of the Invention

This invention relates to circuit packs in systems such as shelf controllers and other circuit pack assemblies.

2. Description of the Prior Art

Any circuit pack in any system that contains data in memory (for example, software) may need to have the data in that memory upgraded at some point, either during development cycles or following deployment in the field. For example, software may need to be upgraded to fix bugs or to introduce new features. For this reason, some prior art systems with circuit packs are designed so that software can be upgraded without the need to replace any hardware components. This is done by using memory devices which can be erased and reprogrammed, for example, flash EPROM devices. These prior art systems, however, use external interfaces or support hardware which communicate with and upgrade the memory. Such external interfaces complicate the updating process and increase both the level of operator training required and the potential for errors. The updating of circuit packs must also occur one at a time. Others of these prior art systems use emulators which require that the circuit pack be extracted and that an emulator be used; or remote network devices, which require that the device be on a network and that the circuit pack contain logic to control the update process.

SUMMARY OF THE INVENTION

The present invention seeks to provide a system with multiple circuit packs containing memory in which the memory of one circuit pack can be updated with data from the memory of another circuit pack, and where the entire process is internal to the system.

One aspect of the invention comprises a method for upgrading the contents of a circuit pack containing a memory storage device which stores data within a system comprising two circuit packs containing memory storage devices and a means for communication between said two circuit packs, comprising the steps of: (a) causing one of said two circuit packs, upon receipt by that circuit pack of a signal, to act as slave circuit pack by requesting from the other of said two circuit packs, which acts as master circuit pack, master circuit pack version information stored in a version information storage area within a memory storage device of said master circuit pack to be transferred from said master circuit pack to said slave circuit pack; and (b) causing said slave circuit pack to determine, based upon a calculation using said master circuit pack version information and said slave circuit pack version information stored in a version information memory storage area within a memory storage device of said slave circuit pack, whether said slave circuit pack contains within a memory storage device stored information which should be replaced with stored information that said master circuit pack contains within a memory storage device; and if said slave circuit pack does contain stored information which should be replaced, causing said system to perform steps to effectuate such a replacement.

Another aspect of the invention comprises a method for upgrading the contents of a circuit pack containing a memory storage device which stores data in a system comprising two circuit packs containing memory storage devices and a means for communication between said at least two circuit packs, comprising the steps of (a) upon a signal within the system, causing first circuit pack version information stored in a version information storage area within a memory storage device of said first circuit pack to be transferred from said first circuit pack to said second circuit pack, and causing second circuit pack version information stored in a version information storage area within a memory device of said second circuit pack to be transferred from said second circuit pack to said first circuit pack; (b) causing said first circuit pack to determine, based upon a calculation using said first circuit pack version information and said second circuit pack version information, whether said first circuit pack contains within a memory storage device stored information which should be replaced with stored information that said second circuit pack contains within a memory storage device; and if said first circuit pack does contain stored information which should be replaced, causing said first circuit pack to perform steps to effectuate such a replacement; and (c) causing said second circuit pack to determine, based upon a calculation using said first circuit pack version information and said second circuit pack version information, whether said second circuit pack contains within a memory storage device stored information which should be replaced with stored information that said first circuit pack contains within a memory storage device; and if said second circuit pack does contain stored information which should be replaced, causing said second circuit pack to perform steps to effectuate such a replacement.

According to one embodiment, the present invention provides a method which works in a system containing at least two circuit packs, a first circuit pack and a second circuit pack. When some system signal (for example, a reset signal) is received by either one of the circuit packs, the circuit pack receiving the signal starts to act in a predetermined way, sending requests to the other circuit pack and receiving information from it. While acting in this way the circuit pack receiving the signal is designated a slave circuit pack. The other circuit pack, which receives requests from the slave circuit pack and answers them, is designated a master circuit pack. The slave circuit pack asks for version information for data contained in the master circuit pack and receives that data. The slave circuit pack uses the version information received from the master pack and version information internal to the slave circuit pack to determine whether the data in memory of the slave circuit pack should be updated with the data in the memory of the master circuit pack. For example, the determination may be whether the data in the master circuit pack is a newer version of software or other information that the slave circuit pack should have. If the slave circuit pack determines that an update should occur, the slave circuit pack then causes the master circuit pack to send to the slave circuit pack that data. The slave circuit pack receives the data and writes it to the proper location in its memory. When this is done, the process is over, and the circuit packs continue their usual functioning in the system, until the process is started again by the receipt by one of the circuit packs of the signal which starts its functioning as a slave circuit pack.

According to another embodiment, upon receipt by either or both circuit packs of a system signal, the two circuit packs exchange version information, and whichever of the two circuit packs has older or less preferred data then receives the newer data from the other circuit pack. The transfer of data can be from either a circuit pack that received the signal which initiated the process or from a circuit pack that did not receive a signal, or in some cases, as in the first embodiment, there may be no transfer of data.

Either of the above embodiments allows preferred or newer data to be propagated from one circuit pack to another instead of via external hardware or interfaces. If circuit packs in a number of systems need to be upgraded, then they can be upgraded in the field with only one updated circuit pack. Instead of replacing all circuit packs, place an updated circuit pack in a system in place of a circuit pack with memory containing old information. In many types of circuit pack hardware and configuration, this placement will cause the reset signal that, in some embodiments of the invention, triggers the instant method which causes an update. In other cases, a manual reset will trigger the instant method. After the method causes the updated information to be propagated from the updated circuit pack to another circuit pack in the system using the instant method, that updated circuit pack can be removed and if an circuit pack with old data is placed in the system, it will be updated. By continuing in this way with any other systems in the field, all circuit packs in all systems can be updated from one circuit pack with updated information. A stockpile of circuit packs that contain new information to replace old circuit packs with old information are therefore not necessary.

Other embodiments of this invention cause a transfer of newer information from one circuit pack to another only if a hardware signal indicates that the transfer should occur. In one embodiment, the state of a switch generates the hardware signal; in another embodiment, the LED test switch signal is used; in yet another embodiment, a specific location in the memory of one circuit pack is loaded with a specific value that indicates whether a transfer should occur. These embodiments constitute a semi-automatic mode, which allows a system with multiple circuit packs including a circuit pack with, for example, older data in memory that would have been updated under the previously described embodiments to run and receive the triggering system signal without updating that older data in a circuit pack. It is clear that for testing or other reasons an older version of data may be beneficial in a system, and this semi-automatic functioning provides a means by which upgrading of older data is possible but not automatic.

In a preferred embodiment of this invention, the circuit packs are Metallic Shelf Controller circuit packs (MSCs) and the system is a Lucent Technologies AnyMedia Access System.

BRIEF DESCRIPTION OF THE DRAWINGS

Other features and advantages of the present invention will be described in further detail with reference to the accompanying drawing, in which.

DETAILED DESCRIPTION

Figure 1:
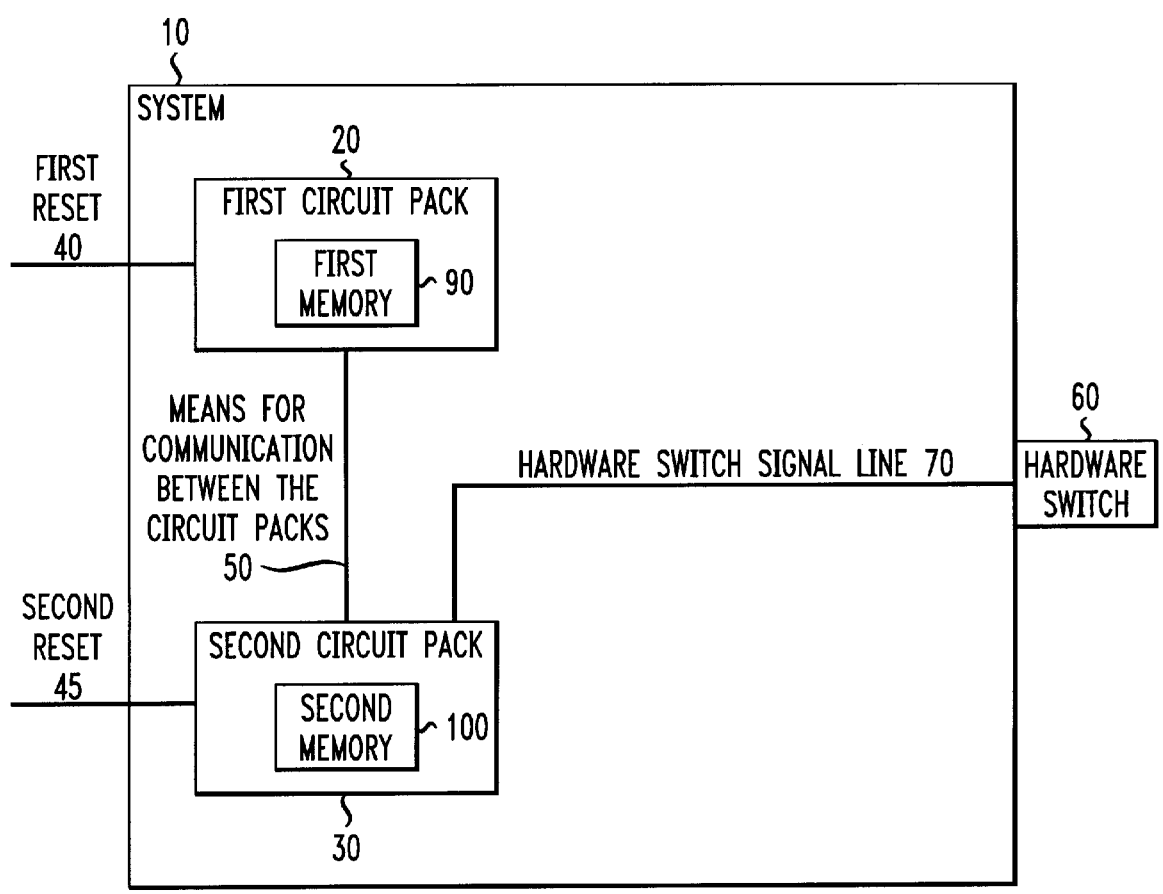
FIG. 1 is a diagram of a system according this invention, as described below.

Referring now to FIG. 1, which shows one embodiment of the invention, a system, 10, includes a first circuit pack, 20, a second circuit pack, 30, and a means for communication between the circuit packs, 50. The system also includes a hardware switch, 60, a hardware switch signal line, 70, a first reset, 40, and a second reset, 45. First circuit pack, 20, contains first memory, 90, and second circuit pack, 30, contains second memory, 100.

When either of the first circuit pack, 20, or the second circuit pack, 30, receives a reset signal from its respective reset line (first reset, 40, for the first circuit pack, 20, and second reset, 45, for the second circuit pack, 30) that circuit pack becomes the slave circuit pack, and acts in a specific way. If, for example, the first circuit pack, 20, has received the signal and is the slave circuit pack, it sends a request over the means for communication, 50, to second circuit pack, 30, to send information from the second memory, 100, about the version of data stored there. The second circuit pack, 30, then becomes the master circuit pack. In response to the request, the second circuit pack, 30, then sends to the first circuit pack, 20, over means for communication, 50, the version information requested. First circuit pack, 20, compares the version information received from the second circuit pack, 30, to version information it has internally, in the first memory, 90. It also checks the state of the hardware switch, 60, by checking the signal on the hardware switch signal line, 70. If the version information received by the first circuit pack, 20, from second circuit pack, 30, is more current than the version information stored in first memory, 90, and if the hardware switch signal is on, then the first circuit pack, 20, initiates an update of first memory, 90. (If either the version information received is older (or the same as) the version information stored, or the hardware switch signal is off, then no update will occur, and nothing further occurs until the next reset signal on one of the reset lines, 40 and 45.)

To update first memory, 90, first circuit pack, 20, erases first memory, 90, and then sends a message over the means for communication, 50, to second circuit pack, 30, requesting that second circuit pack, 30, send the data contained in second memory, 100, to first circuit pack, 20. Second circuit pack, 30, will read five bytes of the data from second memory, 100, and send it over the means for communication, 50, to first circuit pack, 20. When first circuit pack, 20, receives this data, it writes it into first memory, 90, in the lowest address in memory. When first circuit pack, 20, is done, it sends an acknowledgment via means for communication, 50, to second circuit pack, 30. Upon receipt of the acknowledgment, second circuit pack, 30, sends five more bytes and first circuit pack, 20, writes them into memory in the location which begins after the location of the first five bytes and sends an acknowledgment. The second circuit pack, 30, and first circuit pack, 20, continue to send data and acknowledgments in this way until the second circuit pack, 30, has sent all of the data to be written to first memory, 90. Upon receiving the acknowledgment for the last five bytes of memory from first circuit pack, 20, second circuit pack, 30, sends a message to first circuit pack, 20, which indicates that no more data is forthcoming. This completes the update of first memory, 90.

According to this embodiment, if second circuit pack, 30, and not first circuit pack, 20, had received the initial reset signal, then second circuit pack, 30, would have acted in the way described above for first circuit pack, 20, and vice versa. That is, the actions described above for first circuit pack, 20, are carried out by second circuit pack, 30, as the slave circuit pack, and the actions described above for second circuit pack, 30, are carried out by first circuit pack, 20.

In a second embodiment of the invention, upon receipt of a signal by either circuit pack, the first circuit pack, 20, and the second circuit pack, 30 mutually exchange version information about the version of data stored in first memory, 90 and second memory, 100. Both the first circuit pack, 20, and the second circuit pack, 30, compare the version information received with their internal version information and also check the state of the hardware switch, 60, by checking the signal on the hardware switch signal line, 70. Each of first circuit pack, 20, and second circuit pack, 30, makes the comparison. If the version information received by that pack from the other is more current than the version information stored its memory and if the hardware switch signal is on, then that pack initiates an update of its memory. If either the version information received is older (or the same as) the version information stored, or the hardware switch signal is off, then that pack will not initiate an update of its memory, and unless the other pack initiates an update of that pack's memory, nothing farther will occur until the next reset signal on either first reset 40 or second reset 45, at which point the exchange of version information begins anew, as above.

If an update is initiated, this embodiment then proceeds similarly to the previous embodiment. If the first circuit pack, 20, had determined that it must update its memory, it acts as the first circuit pack, 20, did when acting as slave circuit pack in the first embodiment as described above, and the second circuit pack, 30, acts as the second circuit pack, 30, did when acting as master circuit pack in the first embodiment as described above; if the second circuit pack, 30, had determined that it must update its memory then it acts as the first circuit pack, 20, did while acting as the slave circuit pack as in the first embodiment as described above, and the first circuit pack acts as the second circuit pack, 30, did while acting as the master circuit pack in the first embodiment as described above.

In one embodiment of the invention, the hardware switch signal is a signal provided by the state of an LED test switch. In another embodiment of the invention, instead of a check on a hardware switch signal, a check is made of a location in non-volatile memory in the slave circuit pack and the data contained in that location is used in the determination of whether or not that circuit pack should be updated.

What has been described are only some examples of methods and systems according to the invention. Accordingly, it is to be understood that various and numerous other arrangements may be devised by one skilled in the art without departing from the spirit and scope of the invention as limited only by the accompanying claims.

I claim:

1. A method for upgrading the contents of a circuit pack containing a memory storage device which stores data within a system comprising two circuit packs containing memory storage devices and a means for communication between said two circuit packs, comprising the steps of:
    a. designating a first of said two circuit packs to act as a slave circuit pack;
    b. designating the second of said two circuit packs to act as a master circuit pack;
    c. sending an activation signal only to said first of said two circuit packs whereby, upon receipt by said first circuit pack of said signal, said first circuit pack is caused to act as said slave circuit pack and requests from said second circuit pack, which acts as said master circuit pack, master circuit pack version information stored in a version information storage area within a memory storage device of said master circuit pack to be transferred from said master circuit pack to said slave circuit pack; and
    d. causing said slave circuit pack to determine, based upon a calculation using said master circuit pack version information and said slave circuit pack version information stored in a version information memory storage area within a memory storage device of said slave circuit pack, whether said slave circuit pack contains within a memory storage device stored information which should be replaced with stored information that said master circuit pack contains within a memory storage device; and if said slave circuit pack does contain stored information which should be replaced, causing said system to perform steps to effectuate such a replacement.

2. The method of claim 1 where said calculation using said master circuit pack version information and said slave circuit pack version information also uses information from a check on a means to indicate a state within said system.

3. The method of claim 2 where said means to indicate a state within said system comprises the contents of a data location within a memory storage device of said slave circuit pack.

4. The method of claim 3 where said data location is in a non-volatile portion of a memory storage device on the slave circuit pack.

5. The method of claim 2 where said means to indicate a state within said system comprises an externally provided hardware signal.

6. The method of claim 5 where said externally-provided hardware signal comprises a switch.

7. The method of claim 5 where said externally-provided hardware signal comprises an LED test button.

8. The method of claim 1 where said calculation using said master circuit pack version information and said slave circuit pack version information comprises a check to see if said master circuit pack version information is more current than said slave circuit pack version information.

9. The method of claim 1 where said steps to effectuate such a replacement consist of the steps of:
    a. causing said slave circuit pack to erase an area of a memory storage device in said slave circuit pack;
    b. causing said slave circuit pack to cause said master circuit pack to send stored information from an area of a memory storage device in said master circuit pack; and
    c. causing said slave circuit pack to receive said stored information from an area of a memory storage device in said master circuit pack and store said stored information from an area of a memory storage device in said master circuit pack in said area of a memory storage device in said slave circuit pack.

10. The method of claim 1 where the means for communication comprises an asynchronous serial interface over which data can be sent.

11. The method of claim 1 where said signal received by said one of said two circuit packs within the system is a reset signal.

12. The method of claim 1 where the system comprises a communications system.

13. The method of claim 1 where the circuit packs comprise shelf controller circuit packs.

14. An apparatus consisting of at least two circuit packs that is adapted to upgrade the contents of one of said circuit packs by the method of claim 1.

15. An apparatus as in claim 14 where the apparatus is a communications system.

16. An apparatus as in claim 14 where the circuit packs are metallic shelf controller circuit packs.

17. The method of claim 1 including the steps of
    a. operating said two circuit packs in a normal function mode before the activation signal is sent to said first of said two circuit packs;
    b. continuing to operate said master pack in said normal function mode after the activation signal is sent to said first circuit pack whereby said first circuit pack is caused to act as said slave circuit pack in a reprogramming function mode.

* * * * *